US007010993B2

(12) United States Patent
Schuda et al.

(10) Patent No.: US 7,010,993 B2

(45) Date of Patent: Mar. 14, 2006

(54) UNIVERSAL POWER OPERATOR

(75) Inventors: David Schuda, Wheaton, IL (US); Celestino Casali, Bergamo (IT)

(73) Assignee: The Chamberlain Group, Inc., Elmhurst, IL (US)

(*) Notice: Subject to any disclaimer, the term of this patent is extended or adjusted under 35 U.S.C. 154(b) by 10 days.

(21) Appl. No.: 10/377,578

(22) Filed: Feb. 28, 2003

(65) Prior Publication Data

US 2003/0233901 A1 Dec. 25, 2003

Related U.S. Application Data

(60) Provisional application No. 60/361,120, filed on Mar. 1, 2002.

(51) Int. Cl.
*F16H 27/02* (2006.01)

(52) U.S. Cl. ........................................ 74/89.29; 74/425

(58) Field of Classification Search .................. 74/425, 74/89.23, 89.27, 424.8, 89.29; 380/610
See application file for complete search history.

(56) References Cited

U.S. PATENT DOCUMENTS 4,041,795 A * 8/1977 Rekoff, Jr. ................. 74/89.27
4,850,094 A * 7/1989 Lybecker ..................... 29/434
5,386,885 A 2/1995 Bunzl et al.
5,842,377 A * 12/1998 Hutchings et al. ............ 74/420
5,913,763 A 6/1999 Beran et al.
6,032,329 A 3/2000 Casali
6,101,889 A * 8/2000 Laskey ...................... 74/89.23
6,223,469 B1 5/2001 Moll
2002/0066325 A1* 6/2002 Roither et al. ............. 74/89.23

OTHER PUBLICATIONS

Search Report for PCT patent application PCT/US03/06043 mailed Oct. 8, 2003.

* cited by examiner

*Primary Examiner*—David Fenstermacher
(74) *Attorney, Agent, or Firm*—Fitch, Even, Tabin & Flannery

(57) ABSTRACT

A universal power operator for shifting a movable barrier, such as a gate, and a circuit control system for operation thereof, is shown that allows the operator to be assembled for both a left-hinged or right-hinged movable barrier. The universal power operator includes generally an actuator arm, a housing assembly, a gear assembly, and a modular drive motor. The housing assembly contains generally symmetrical portions allowing the user to interchangeably assemble the motor in one of two positions for use with a left-hinged or right-hinged movable barrier.

6 Claims, 15 Drawing Sheets

UNIVERSAL POWER OPERATOR

RELATED APPLICATION

This application claims the benefit of U.S. Provisional Application No. 60/361,120 filed Mar. 1, 2002.

FIELD OF THE INVENTION

The invention relates generally to a universal power operator, and more particularly, to a universal power operator for shifting a movable barrier.

BACKGROUND OF THE INVENTION

Operator assemblies, such as gate operators, are typically used for the opening and closing of movable barriers, such as gates for selectively permitting access to a driveway or a walkway. These gate operators may use a system of linkage arms to pivot a hinged gate about its hinges and move the gate between open and closed positions.

Gate operators typically have a motor with an output shaft offset from the linkage or operating arms connected to the gates. However, offsetting the motor may require two different models of gate operators to be made, one for operating gates hinged on their left sides and another for operating gates hinged on their right sides. Two models are required because many gate operators typically should be flush with but not touching the gate, and an offset motor protrudes to one side or the other of a gate operator. Accordingly, one type of gate operator may be too bulky to be used on one side and/or will not be able to be used with a particular gate configuration due to interference with the offset motor.

Providing two different models of gate operators, each designed for a specific hinge orientation of the gate, is disadvantageous in that it may increase the complexity and cost of producing the two different gate operators. Furthermore, having gate operators configured for solely right or left hand hinged gates limits the versatility of the operators. Thus, a universal power operator that can be used with different gate configurations would be desirable.

SUMMARY OF THE INVENTION

In accordance with the invention, a power operator for shifting a movable barrier, such as a gate, and a circuit control system for operation thereof, is provided that allows the operator to be assembled for both a left-hinged or right-hinged movable barrier to provide a more universal use thereof. Providing a standardized operator assembly that can be assembled by the end user for use with either type of movable barrier increases the versatility of the operator assembly. It eliminates the need for the end user to buy two different models of operators. Further, it reduces manufacturing costs by eliminating the need for additional tooling as well as eliminating additional costs associated with having both model configurations in stock.

The universal power operator herein preferably includes a relatively small number of parts for ease of assembly and to reduce costs. The components of the operator are easily integrated with each other during assembly. The operator may be assembled by end users from a kit, may be installed by professional installers, or may be stock items that the manufacturer can employ in production.

The universal power operator includes a modular motor that can be mounted in either of two positions, for example, to a substantially symmetrical housing assembly and a gear assembly that is accessible to the motor from either side. The motor includes an output shaft, and the user may assemble the motor by mounting the output shaft to the gear assembly. The motor may be positioned in a first position relative to the housing assembly, allowing the operator to open and close a left-hinged gate, and may be removed and repositioned in a second position, allowing the operator to open and close a right-hinged gate. This interchangeable assembly allows the user to select the configuration or position of the motor so as to provide the required clearance for a particular configuration of movable barrier, allowing the universal power operator to be used with either type of movable barrier. In addition, it preferably provides a pleasing symmetrical appearance to passersby.

The universal power operator further includes an actuator driven by the motor for shifting the movable barrier. The motor may have a predetermined power rating and may drive the actuator with a predetermined force. The actuator has an actuator arm that is pivotally connected to a movable barrier to push and pull the movable barrier between open and closed positions.

In addition, the actuator has a drive shaft that can be operatively interconnected with the output shaft of the motor. The motor drives the actuator through the use of an intermediate gear assembly between the drive shaft of the actuator and the motor output shaft. The intermediate gear assembly transmits rotation from the motor output shaft to the actuator drive shaft to shift the actuator arm between retracted and extended positions. When fully retracted, the actuator arm may be disposed within the housing assembly along the housing axis. The arm may also be axially extended out from the housing for shifting of the movable barrier.

The housing assembly has portions that are generally symmetrically arranged on either side of the housing axis. These portions form substantially symmetrical spaces in which the motor output shaft can be received to drive the gear assembly, and in turn drive the actuator arm. These substantially symmetrical spaces allow the motor to be repositioned in one of two positions relative to the housing assembly based on whether the movable barrier is a left-hinged or right-hinged operating gate. This symmetry allows assembly of the motor to either lateral side of the housing axis.

The drive shaft may comprise a threaded screw coaxially aligned with the arm, the threaded screw having a threaded region adapted for engagement with an internal thread or nut provided on the second end of the arm. The threaded screw may be arranged for rotation by the gear assembly, such that rotation of the motor output shaft will cause rotation of the threaded screw. Rotation of the threaded screw may then cause the nut and thus the arm to be advanced or retracted relative thereto, depending upon the direction of rotation of the motor output shaft.

As stated above, the universal power operator includes a modular motor that can be mounted in either of two positions. The present invention further includes a circuit control system for changing the operation of the motor depending on how the motor is mounted. For example, when the motor is mounted in one position corresponding to a left-hinged gate, the motor rotates in a clockwise manner to open the gate. In contrast, when the motor is mounted in the second position corresponding to a right-hinged gate, the motor rotates in a counterclockwise manner to open the gate.

These and other advantages are realized with the described universal power operator. The invention's advantages may be best understood from the following detailed description taken in conjunction with the accompanying drawings.

DETAILED DESCRIPTION OF THE PREFERRED EMBODIMENTS

Figure 1:
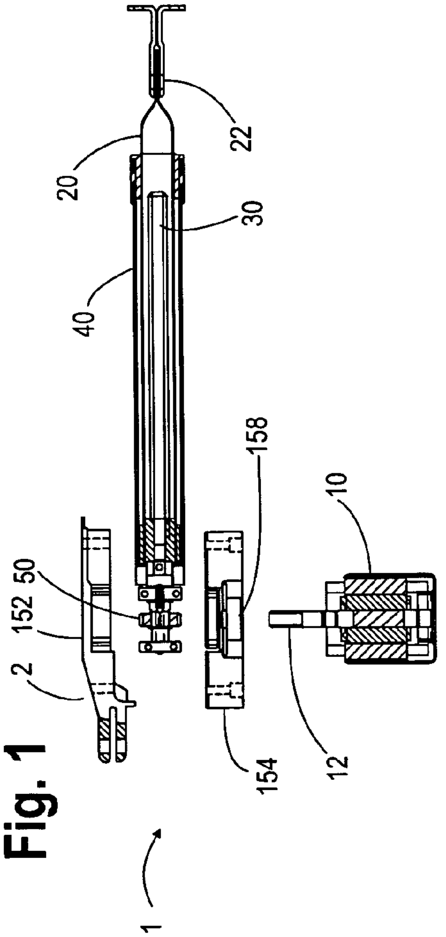
FIG. 1 is an exploded top plan view of a universal power operator according to an embodiment of the invention.
Figure 7:
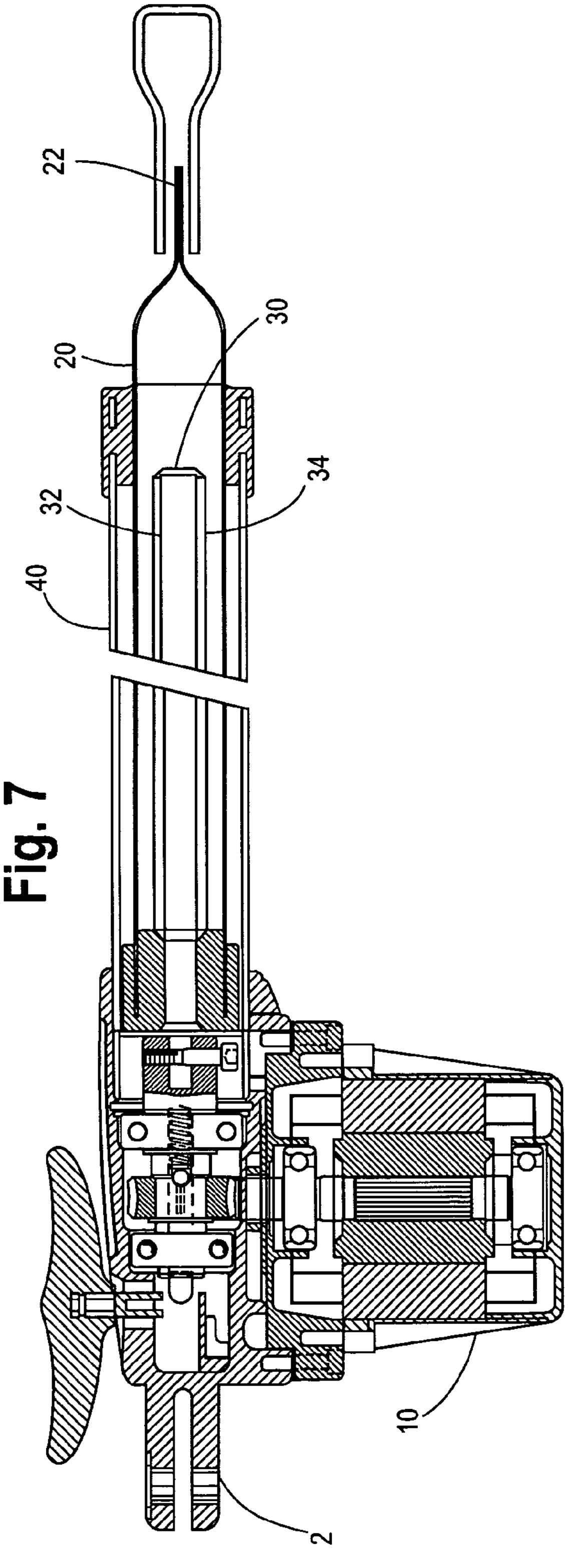

FIGS. 1–25 illustrate a universal power operator 1 in accordance with aspects of the invention. The universal power operator 1 generally comprises a motor 10 adapted for rotating a driving shaft 30, as illustrated in FIG. 1, wherein rotation of the driving shaft 30 causes the extension or retraction of an actuator arm 20 relative to the driving shaft 30 with a predetermined output force. A movable barrier, such as a gate, is pivotably connectable relative to the actuator arm 20 and is selectively movable with the predetermined output force thereof. Both the driving shaft 30 and the actuator arm 20 are housed within a tube, or hollow housing assembly 40, as illustrated in FIGS. 1 and 7.

A gear assembly 50 is provided between an output shaft 12 of the motor 10 and the driving member 30 and is operative to shift the actuator arm 20 between retracted and extended positions. The gear assembly 50 preferably includes a connection to the driving shaft 30, two ball bearings 18, and the worm gear 68. The gear assembly 50 transmits the rotation power of the motor 10 to the driving member 30. The predetermined output force of the actuator arm 20 is determined by the gear assembly 50. The gear assembly 50 may be fixed or may be made selectively adjustable in order to allow configuration and tailoring of the operator assembly 1 with a variety of different barrier or gate sizes.

Figure 8:
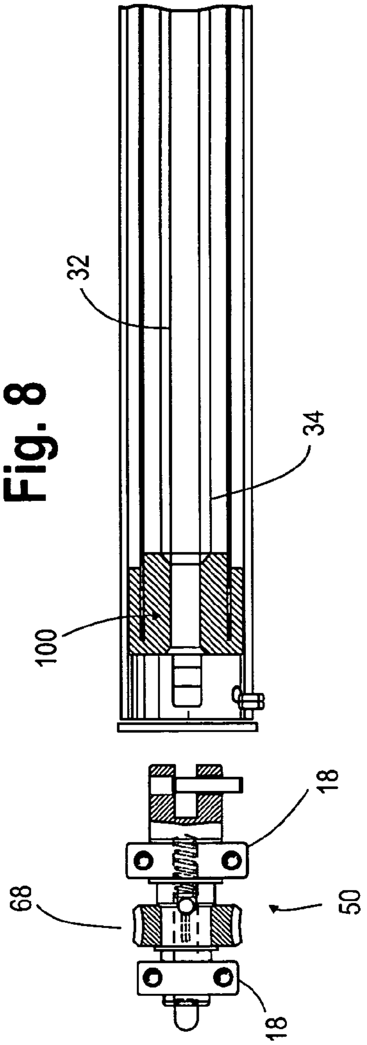
FIG. 8 is a partial section view of the gear assembly and drive shaft of the universal power operator of FIG. 1.
Figure 11:
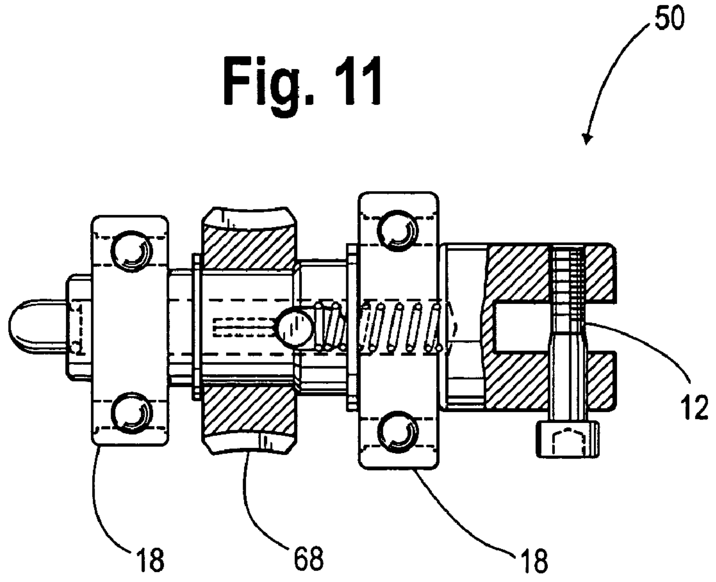
FIG. 11 is a section view of a gear assembly of the universal power operator of FIG. 1.

In the preferred form, the gear assembly 50 includes a worm gear 68, as shown in FIGS. 8 and 11, although other such gears adapted for transmitting rotational forces in perpendicular arrangements could easily be used instead. The worm gear 68 used in this embodiment is irreversible, and thus, the motor 10 can drive the worm gear 68 and not vice versa. This is an important security feature because it inhibits opening of the movable barrier when the barrier is closed.

Worm gear 68 is adapted to be driven by motor output shaft 12. In turn, worm gear 68 is operatively connected relative to an end of the driving shaft 30. Thus, the gear assembly 50 provides for the rotation of the driving shaft 30 via rotation of the motor output shaft 12. If desired, various types of gears could easily be incorporated to provide a gearing ratio for adjusting the output force relative to the rotation of the motor output shaft 12.

Figure 3:
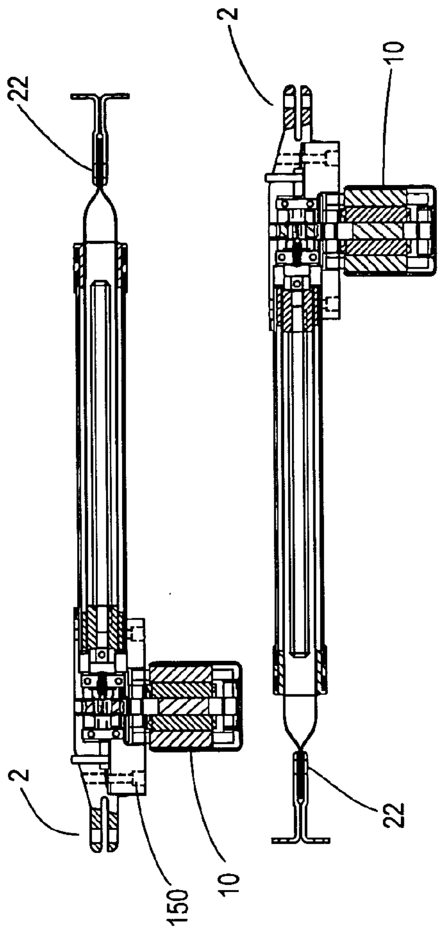
FIG. 3 is a top plan view of the assembled universal power operator of FIG. 1.
Figure 4:
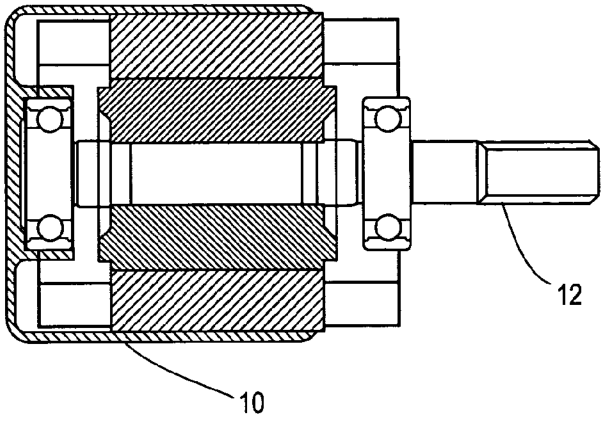
FIG. 4 is a section view of the motor of the universal power operator shown in FIG. 1.
Figure 5:
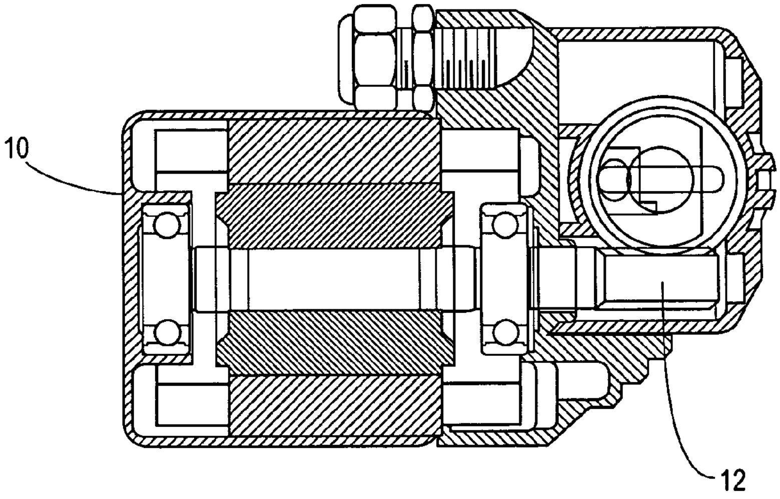
FIGS. 5–7 are section views of the assembled universal power operator of FIG. 1.
Figure 6:
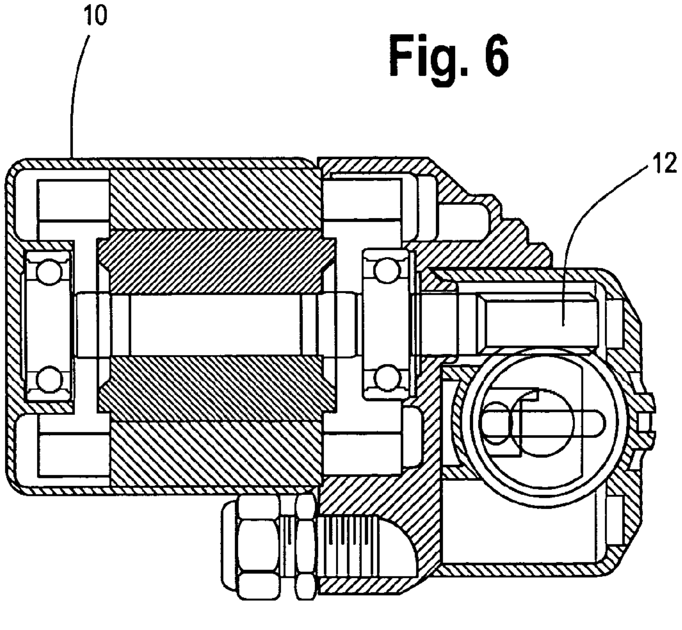

As can be seen in FIG. 1, the actuator arm 20, the driving shaft 30, and the gear assembly 50 are substantially coaxially aligned with each other. The coaxial arrangement of the housing assembly 40 and the bilateral accessibility of the gear assembly 50 allow assembly of the motor 10 to either lateral position of the universal power operator 1, as shown in FIG. 3. This interchangeability allows the universal power operator 1 to be used with either left-hinged or right-hinged movable barriers. For instance, the coaxial arrangements provide a universal power operator 1 that can be used with both left-hinged gates and right-hinged gates.

The motor 10 may be interchangeably positioned in one of two positions relative to the housing assembly 40. The motor 10 is interchangeable because the housing assembly 40 has portions that are generally symmetrically arranged on either side of the housing axis and creating substantially symmetrical spaces in which the motor output shaft 12 can be received to drive the gear assembly 50. The gear assembly 50 is accessible to the motor output shaft 12 from either side, and the gear assembly 50 drives the actuator arm 20 to open and close the movable barrier.

As illustrated in FIGS. 1 and 3, when the universal power operator 1 is fully assembled, the gear assembly 50 is disposed within a casing 150. The casing 150 may be formed of a plastic or polymer material, and can be shaped to add visual appeal to the universal power operator 1, to protect the components from dirt, debris, or liquid, and/or to provide mounting surfaces for the various components thereof. As illustrated in FIG. 1, the casing 150 comprises at least two separate shells 152 and 154 that may be removably joined together to form the casing 150.

Figure 2:
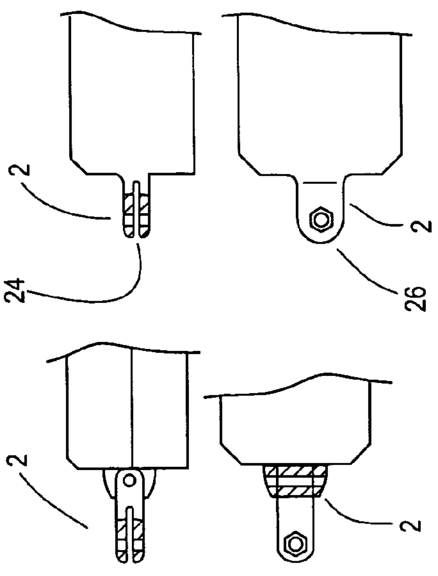
FIG. 2 is a side elevational view of the pivot connection of the universal operator shown in FIG. 1.
Figure 13:
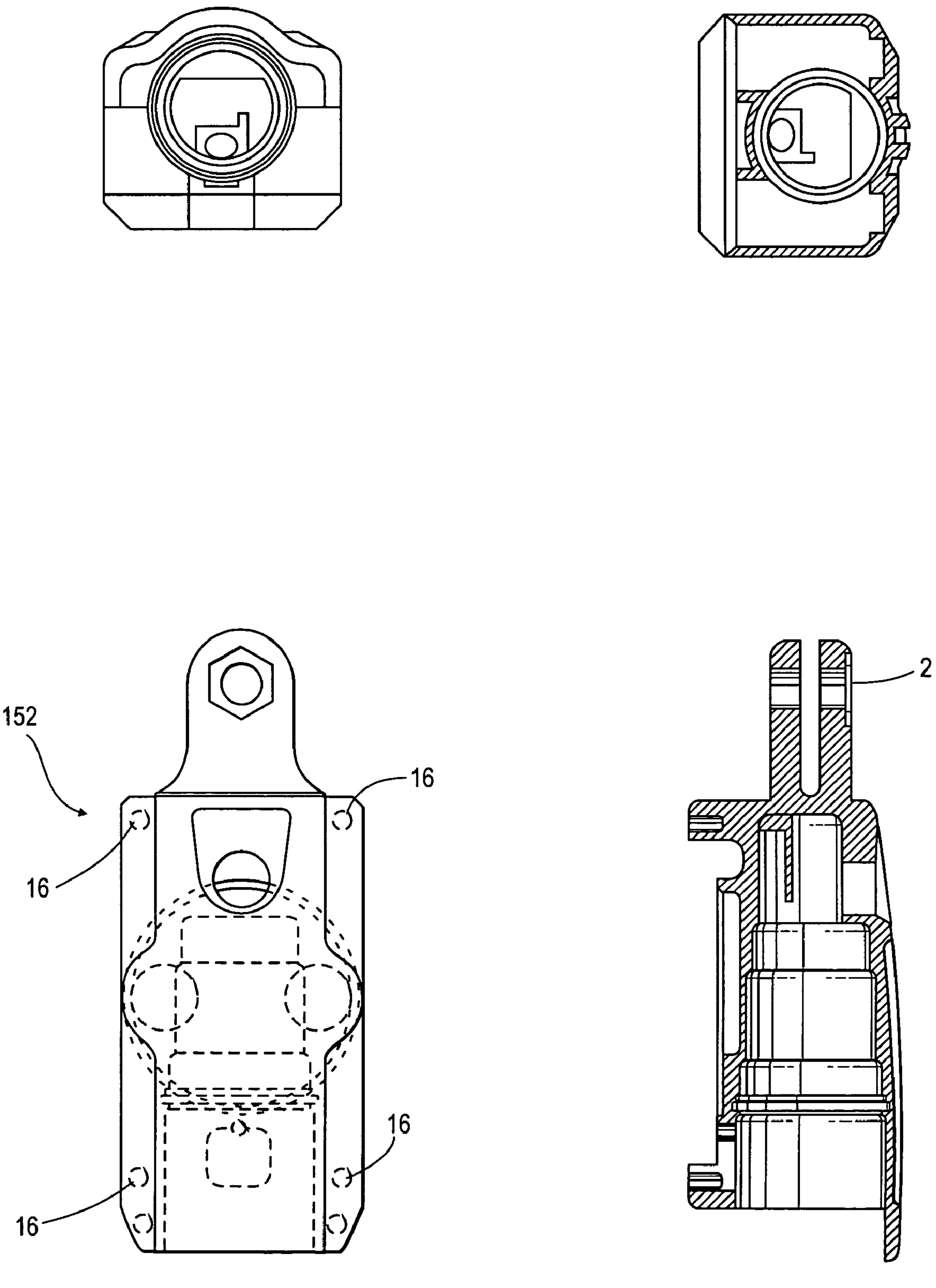
FIG. 13 is a section view of a top casing shell, or motor housing, of the universal power operator of FIG. 1.

The casing shells 152 and 154 serve additional purposes. As shown in FIGS. 1 and 13, top casing shell, or motor housing, 152 may be connected to pivotal connection 2, which in turn may be connected to a fixed mount. As shown in FIG. 2, top casing shell 152 may contain an aperture 26 through which a pin may be inserted to attach top casing shell 152 to pivotal connection 2. Alternatively, the top casing shell, or motor housing, 152 and the pivotal connection 2 may be fashioned of one machined piece.

Figure 14:
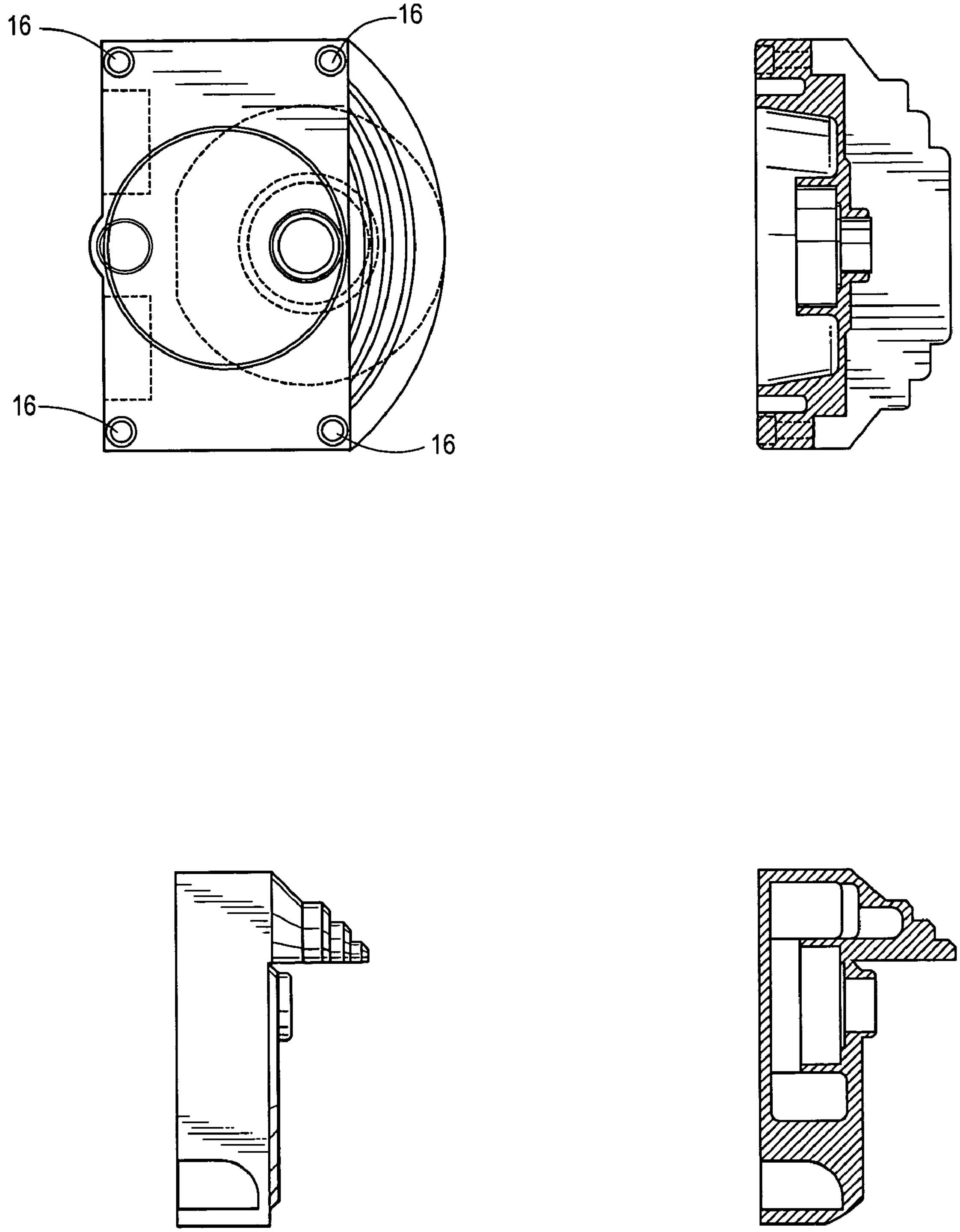
FIG. 14 is a section view of a bottom casing shell, or motor support housing, of the universal power operator of FIG. 1.

As shown in FIGS. 1 and 14, bottom casing shell, or motor support housing, 154 has an aperture 158 therethrough for insertion of the output shaft 12 of the motor.

Bottom casing shell 154 is fashioned to guide and operatively position the output shaft 12 of the motor with respect to the gear assembly 50. Accordingly, bottom casing shell, or motor support housing, 154 also serves as a mounting bracket. Casing shells 152 and 154 may be removed by the user to allow the user to reposition the motor 10 for the operation of a left-hinged or right-hinged movable barrier.

The motor 10 can be assembled on either side of the gear assembly 50 without interfering with the performance of the universal power operator 1. The accompanying parts fit on either the left or right side of the gear assembly 50, appearing the same whether installed in either orientation. As shown in this embodiment, four bolts 16 are used to secure the top and bottom casing shells, or motor and motor support housings 152 and 154, to the operator 1, thereby creating a strong stable platform for the operator 1, although other types of fasteners may be used. Because of the general symmetry of the operator design, the top and bottom casing shells 152 and 154 may be rotated 180 degrees and the same four mounting bolts 16 used to secure the casing shells 152 and 154 to the operator 1. This design results in advantages, such as easy field changes, relatively few parts, and no additional parts required to transform the operator 1 from one configuration to the other.

As discussed hereinabove, rotation of the driving shaft 30 causes the extension or retraction of the actuator arm 20 relative to the driving shaft 30 with a predetermined output force. When the universal power operator 1 is pivotably connected at one end to a mount fixed independently relative to the movable barrier and at another end pivotably connected relative to the movable barrier, the extension or retraction of the actuator arm 20 causes the shifting of the movable barrier.

Figure 9:
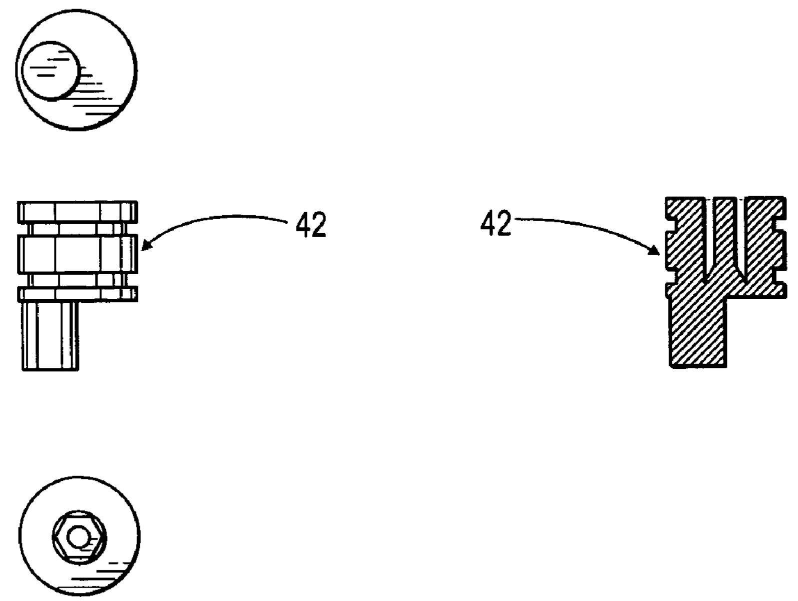
FIG. 9 is a section view of a mechanical release mechanism of the universal power operator of FIG. 1.
Figure 10:
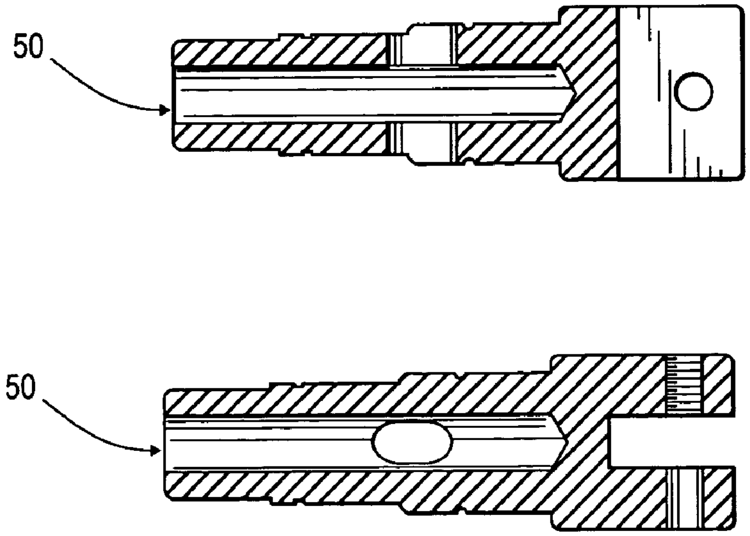
FIG. 10 is a section view of a gear assembly of the universal power operator of FIG. 1.
Figure 12:
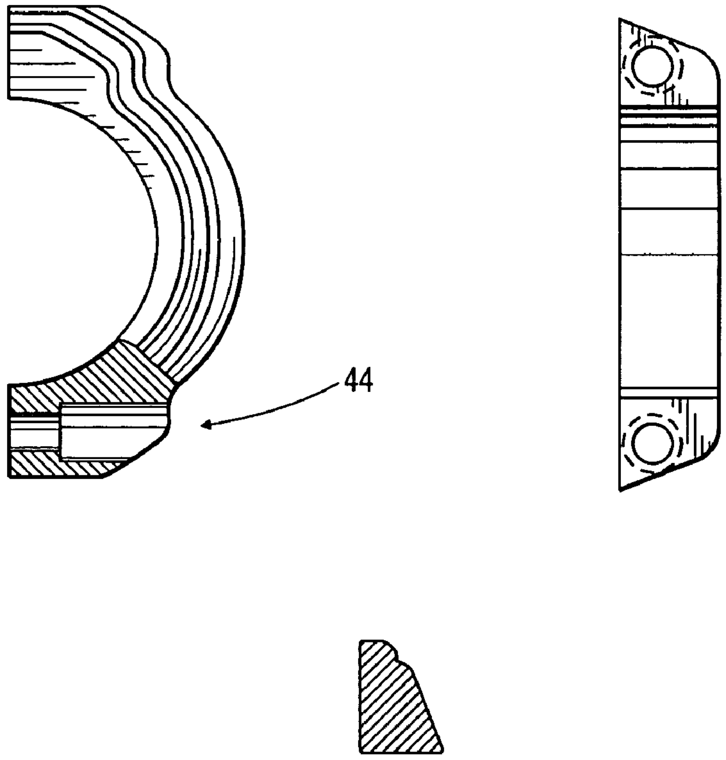
FIG. 12 is a section view of a collar securing the actuator arm to the universal power operator of FIG. 1.
Figure 15:
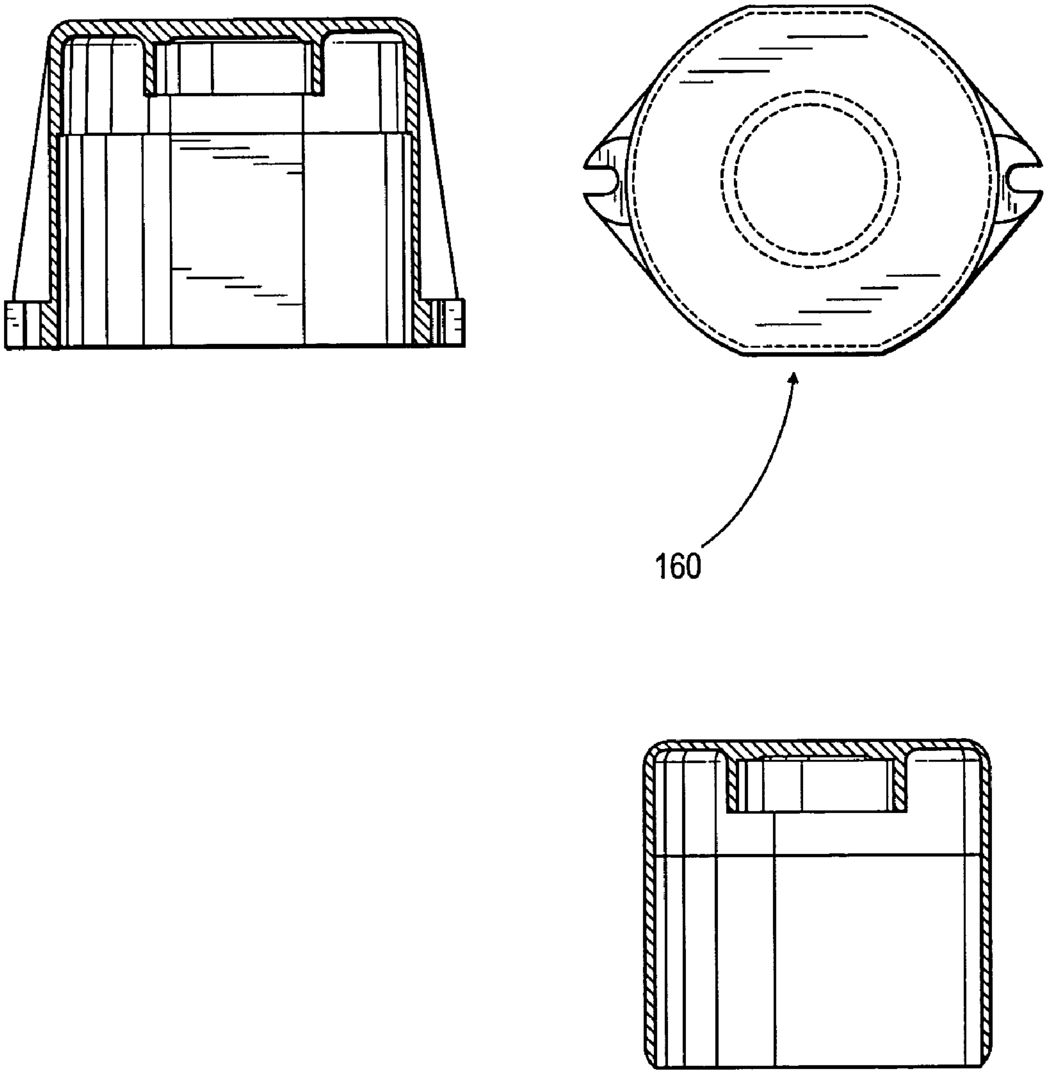
FIG. 15 is a section view of a motor endbell of the universal power operator of FIG. 1.
Figure 16:
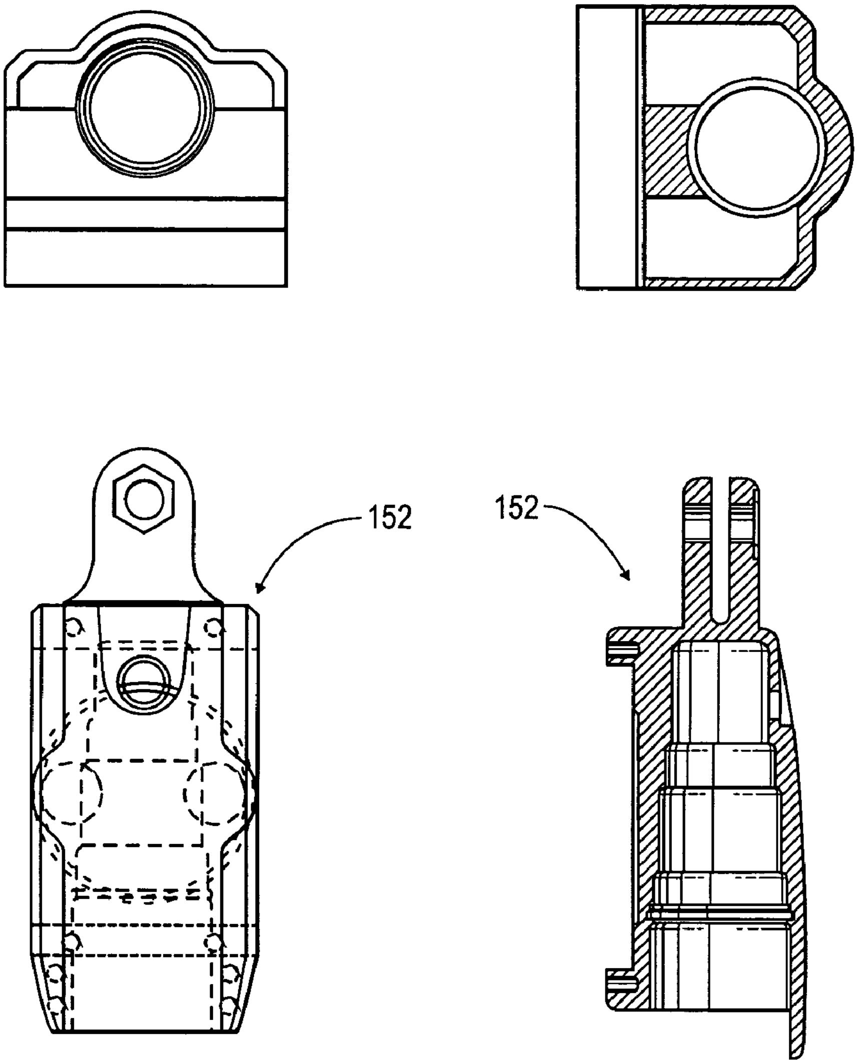
FIG. 16 is a section view of a top casing shell, or motor housing of FIG. 13.
Figure 17:
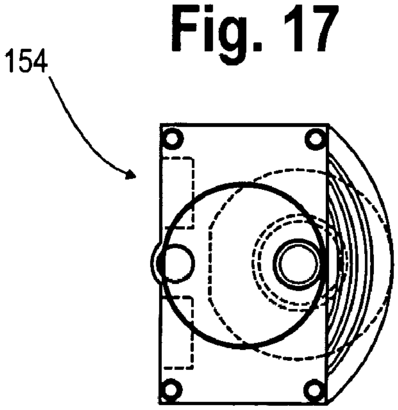
FIG. 17 is a section view of a bottom casing shell, or motor support housing, of FIG. 14.
Figure 18:
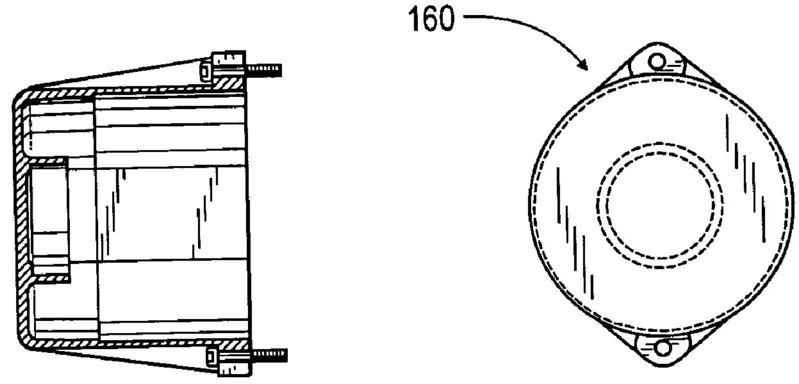
FIG. 18 is a section view of a motor endbell of FIG. 15.
Figure 19:
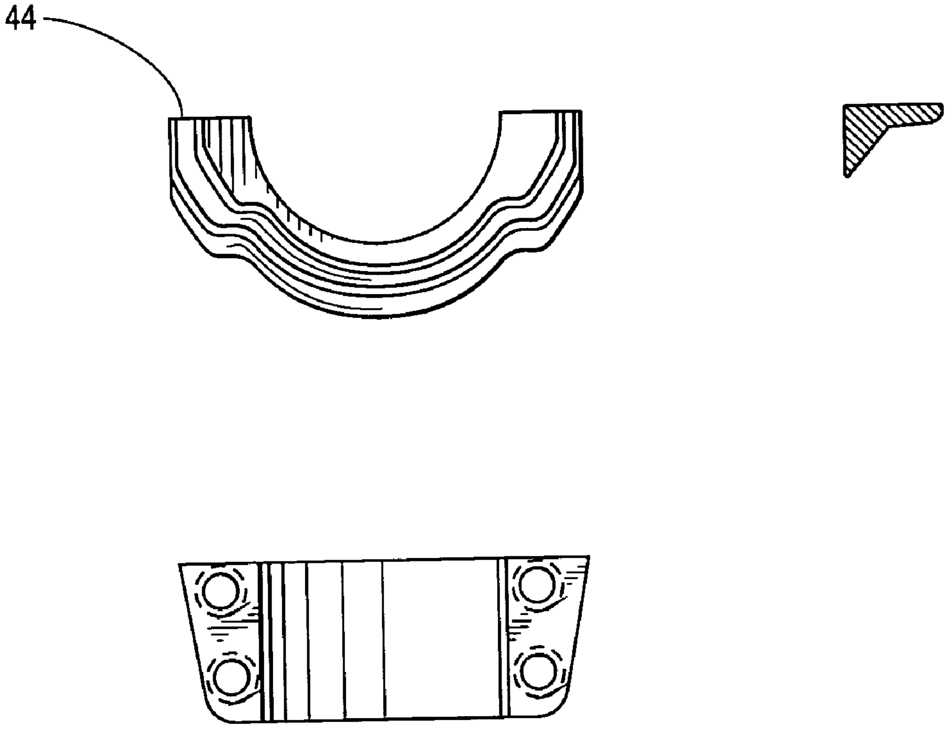
FIG. 19 is a section view of a securing collar of FIG. 12.
Figure 20:
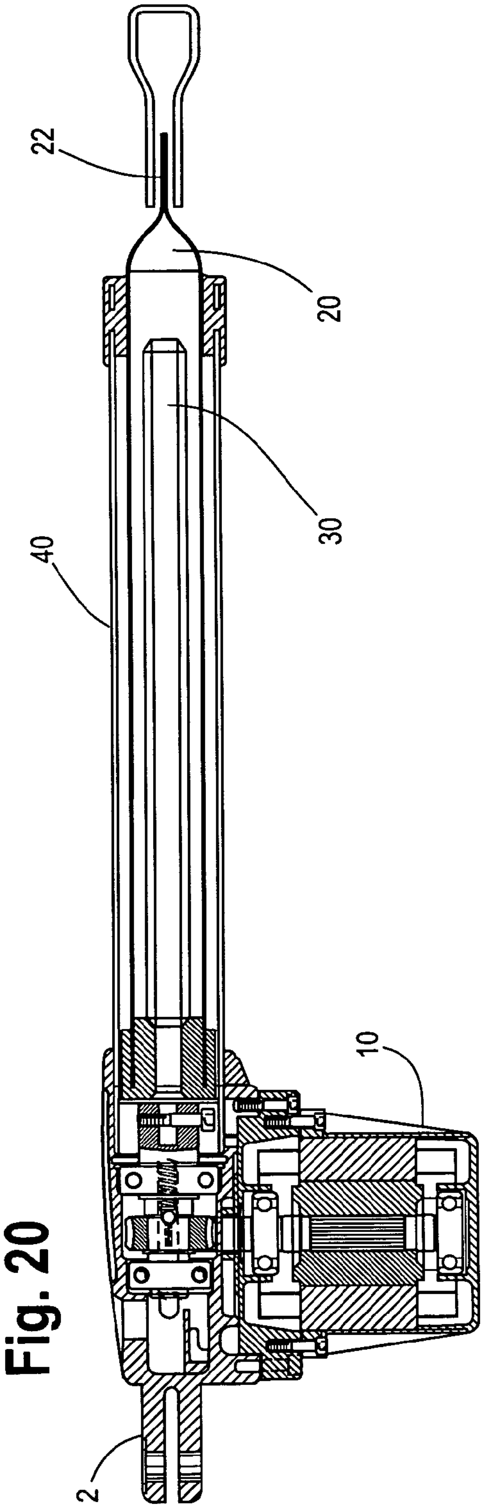
FIG. 20 is a section view of the assembled universal power operator of FIG. 1.
Figure 20:
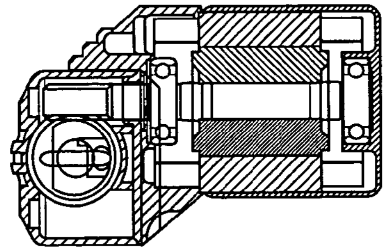
Figure 21:
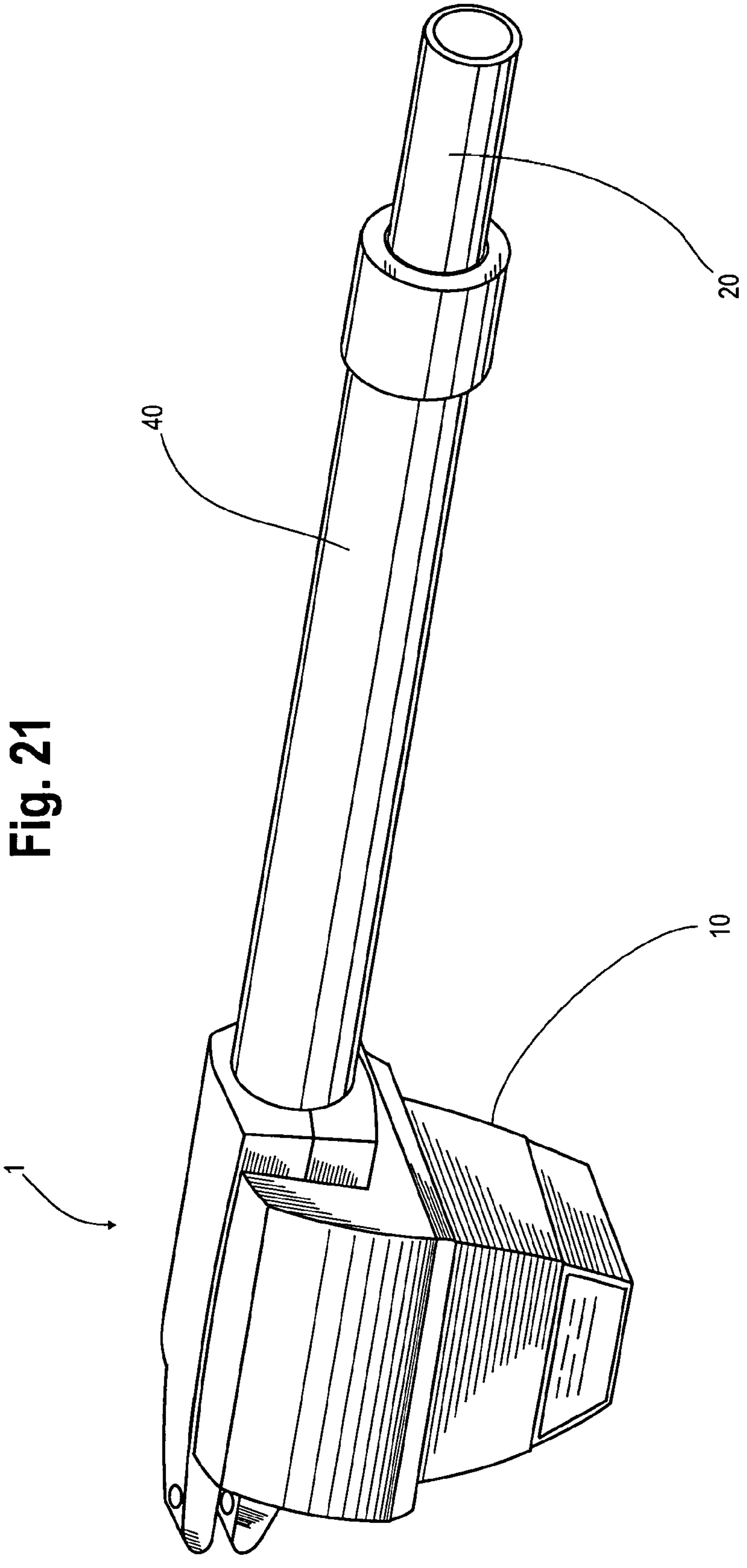
FIGS. 21–23 are perspective views of the assembled universal power operator of FIG. 1.
Figure 22:
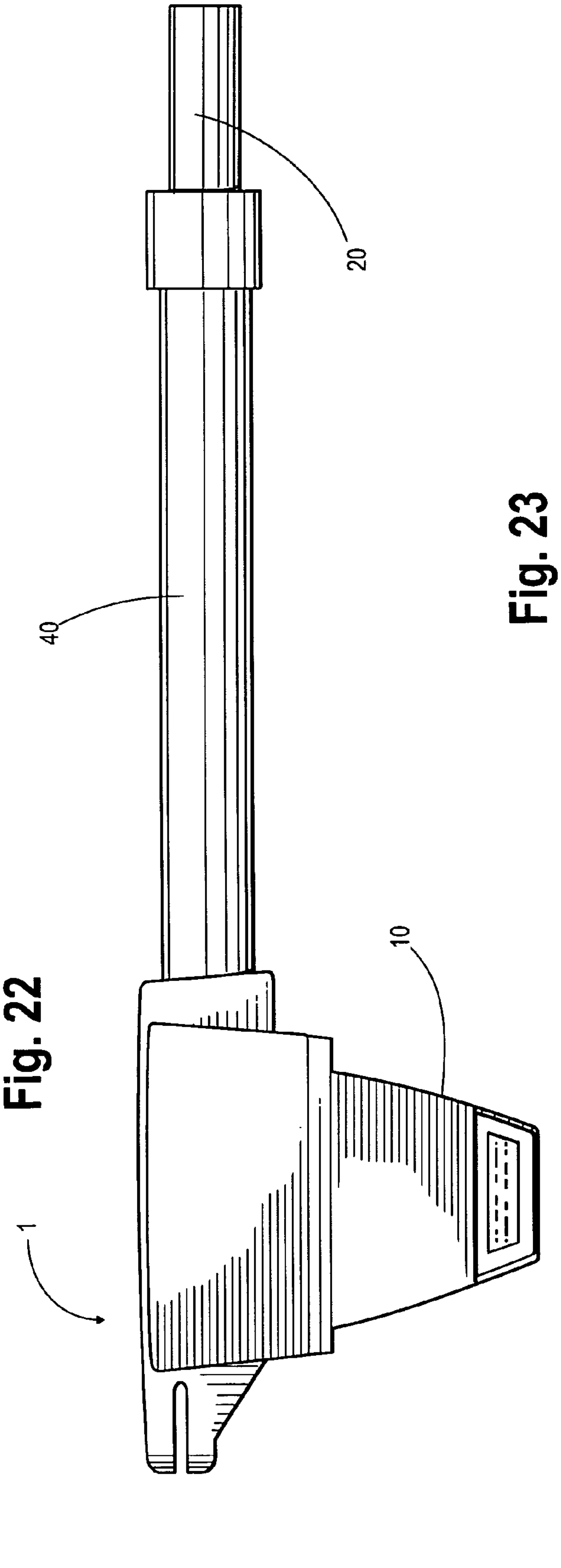
Figure 23:
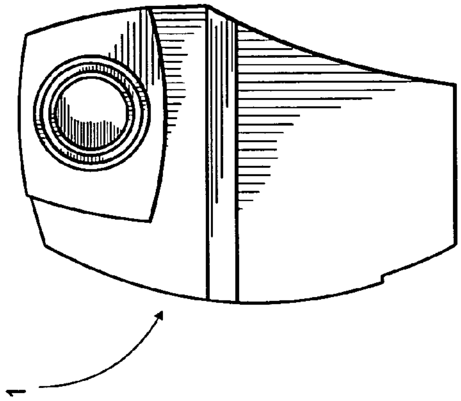
Figure 24:
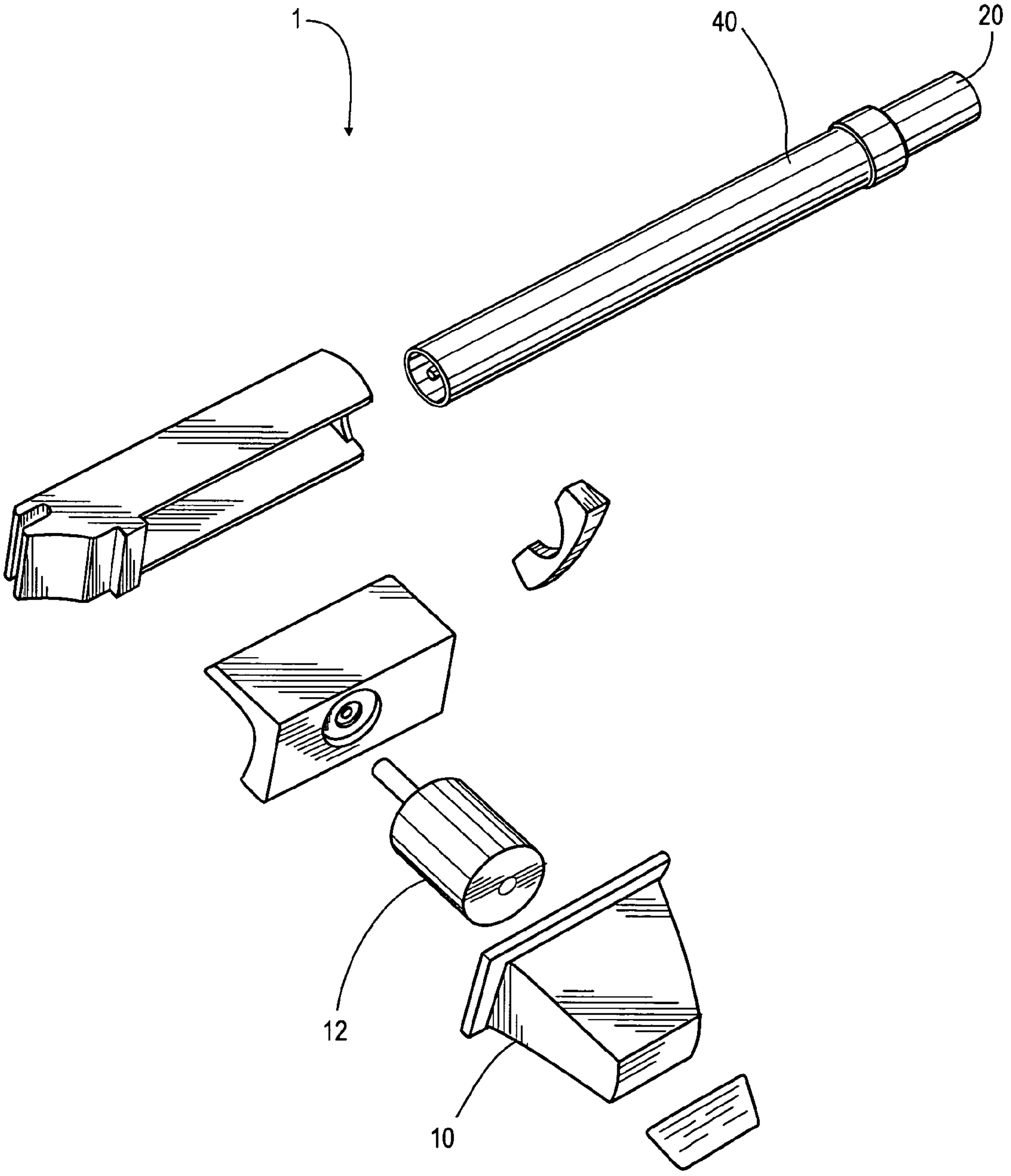
FIGS. 24–25 are exploded perspective views of the universal power operator of FIG. 1.
Figure 25:
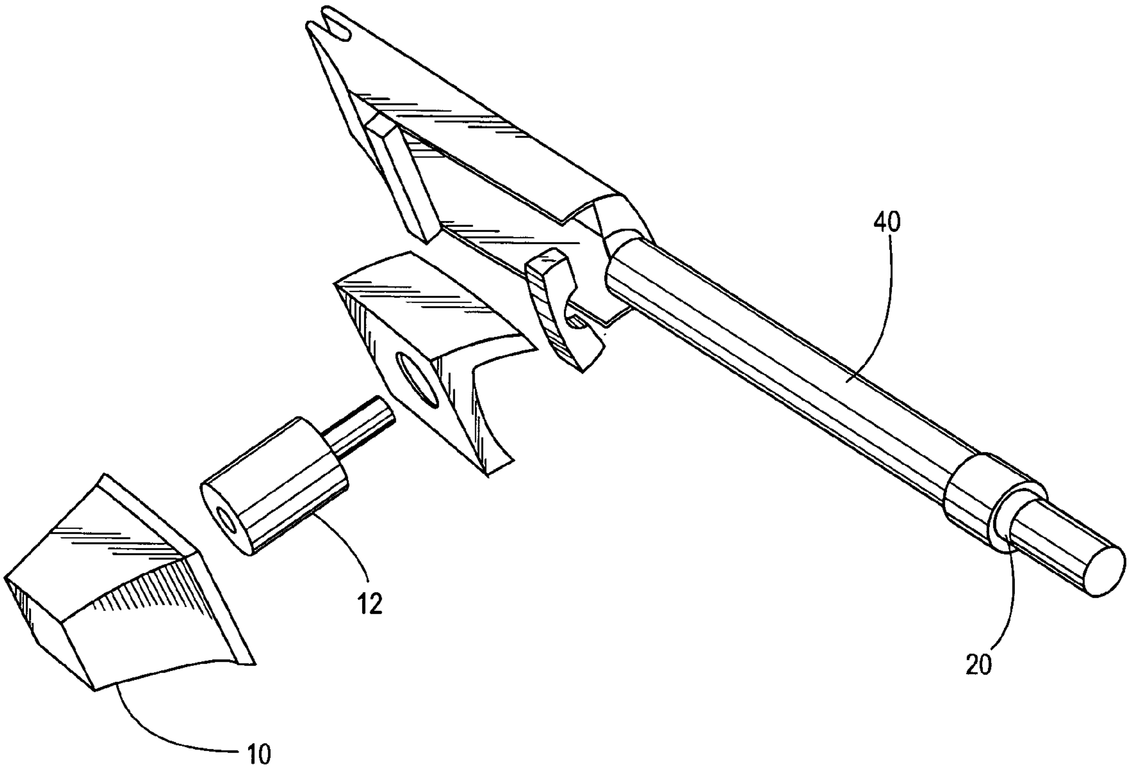

FIGS. 10–11 show a gear assembly 50. In this form, it comprises a connection to the driving shaft 30, two ball bearings 18, and the worm gear 68, and allows the passage of a mechanical release mechanism 42. The mechanical release mechanism 42 is a standard safety mechanism allowing manual operation of the gate if there is no power (FIG. 9). The gear assembly 50 design allows the user to attach the driving shaft 30 to the operator 1 in the field. The aperture 158 in the bottom casing shell 154 allows the user to operatively connect the driving shaft 30 to the motor output shaft 12. After the driving shaft 30 is connected, the housing assembly 40 is inserted into the operator 1 and secured by a collar 44 (FIG. 12). In addition, FIG. 15 shows the motor endbell 160, which supports both the rotor and stator of the motor 10. It can also be modified and used to support a DC motor.

In an aspect of the invention, a first pivot connection 2 is provided at an end of the universal power operator 1. A second pivot connection 22 is also provided at an end of the actuator arm 20 opposite the first pivot connection 2, as illustrated in FIGS. 1 and 3. The first pivot connection 2 is fixable relative to a mount independent of the movable barrier while the second pivot connection 22 is fixable relative to the movable barrier. These pivot positions may also be reversed. The pivot connection 22 may be offset from the longitudinal axis of the arm 20, such as by forming a bend or elbow in the arm 20, to provide a mechanical advantage or to provide for a variety of different installation configurations for the universal power operator 1.

The driving shaft 30 may comprise a: shaft 32 having external threads 34 thereon, as illustrated in FIGS. 7 and 8. A threaded member or nut 100 is provided on the opposite end of the actuator arm 20 from the pivot connection 22. The external threads 34 of the driving shaft 30 cooperate with internal threads formed on the nut 100 to extend or retract the actuator arm 20 relative to the driving shaft 30.

The actuator arm 20 may be shiftably received in the housing assembly 40 along the housing axis, such that it may be axially retracted into the housing 40 and axially extended out from the housing 40. In its retracted state the actuator arm 20 is substantially received within the housing 40, and the nut 100 is in threaded engagement with the shaft 30 and located proximate the motor 10, as illustrated in FIG. 7. As the driving shaft 30 rotates, the external threads 34 thereon, in combination with the pivot connection 22 being fixed relative to the driving shaft 30, cause the outward extension of the arm 20 relative to the housing assembly 40 to an extended position. Different lengths of arms 20 and housing assemblies 40 may be used to vary the amount of extension of the arm 20.

As illustrated in FIG. 2, the pivot connections 2 and 22 may each comprise a flattened region 24 with an aperture therethrough 26. A bushing or other friction reducing surface, such as a bronze or plastic bushing, may be provided for insertion through the aperture and around a pin. An aperture 26 may be adapted to receive the pin or other suitable member for pivotably connecting the casing shell 152 to a fixed mount. An aperture 26 may also be used for pivotably connecting actuator arm 20 to the movable barrier, such as with a yoke mounted relative to the barrier. Forming pivot connection 22 with a flattened region 24 minimizes the number of parts required for the actuator arm 20, such as if a separate pivot connection were attached to the end of the arm 20. Furthermore, the pivot connection 22 provides for simplified manufacture of the actuator arm 20. For example, the pivot connection 22 may be formed by flattening, crimping, or stamping a cylindrical tube to create the flattened region 24. The aperture 26 may be provided in the flattened region 24 after the flattening thereof. The aperture 26 may also be provided in the cylindrical tube prior to flattening thereof.

The term barrier, as used herein, includes gates and other movable barriers. The barrier may include a single hinged gate, or dual hinged gates, each having an operator assembly 1 for shifting thereof. Other types of gate configurations and barriers are also contemplated by the invention, and the universal power operator 1 of the invention may be used therewith.

As stated above, the universal power operator 1 includes a modular motor 10 that can be mounted in either of two positions. The present invention further includes a circuit control system for operating the motor 10 depending on how the motor 10 is mounted. Each universal power operator 1 has circuit connections for a left movable barrier and a right movable barrier, and each circuit connection has two phase wires. When one phase wire is energized, the motor 10 operates in one direction, i.e., in a clockwise direction. When the other phase wire is energized, however, the motor 10 runs in the opposite direction, i.e., in a counterclockwise direction. For each mounting position, the phase wires are reversed, i.e., the logic is reversed, and accordingly, the rotation of the motor 10 is reversed. For example, when the motor 10 is mounted in one position corresponding to a left-hinged gate, the motor 10 may rotate in a clockwise manner to open the gate. In contrast, when the motor 10 is mounted in the second position corresponding to a right-hinged gate, the motor 10 may rotate in a counterclockwise manner to open the gate. In the preferred embodiment, the operator 1 uses standard circuit connections.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A universal power operator for shifting a left-hinged or right-hinged operating movable barrier between open and closed positions thereof, the power operator comprising:

an actuator arm for being connected to the movable barrier to push and pull the movable barrier between the open and closed positions thereof;

a housing assembly in which the arm is shiftably received along a housing axis to be axially retracted into the housing and axially extended out from the housing for shifting of the movable barrier;

a gear assembly operable to shift the arm between the retracted and the extended positions thereof;

a modular drive motor including an output shaft for driving the gear assembly; and portions of the housing assembly generally symmetrically arranged on either side of the housing axis to form symmetrical spaces in which the output shaft of the modular drive motor can be received for driving of the gear assembly to allow the motor to be repositioned in one of two positions relative to the housing assembly based on whether the movable barrier is a left-hinged or right-hinged operating moveable barrier.

2. The universal power operator of claim 1, wherein the gear assembly comprises an irreversible worm gear for inhibiting opening of the moveable barrier when the barrier is closed.

3. The universal power operator of claim 1, further comprising a circuit control system for driving the motor in one direction to open the movable barrier when it is in a left-hinged movable barrier and for riving the motor in the opposite direction to open the movable barrier when it is a right-hinged movable barrier.

4. The universal power operator of claim 1, further comprising a casing for supporting and operatively connecting the motor to the gear assembly.

5. The universal power operator of claim 4, wherein the casing is further comprised of two shells, one of which contains an aperture allowing the motor to be operably connected to the gear assembly.

6. The universal power operator of claim 5, wherein the two shells can be interchangeably connected to either lateral side of the housing axis allowing the motor to be interchangeably mounted to the operator on either side of the housing axis.

* * * * *

UNITED STATES PATENT AND TRADEMARK OFFICE

CERTIFICATE OF CORRECTION

PATENT NO. : 7,010,993 B2 
APPLICATION NO. : 10/377578
DATED : March 14, 2006
INVENTOR(S) : Schuda et al.

It is certified that error appears in the above-identified patent and that said Letters Patent is hereby corrected as shown below:

<u>IN THE CLAIMS:</u>

In Claim 3, Col. 8, line 8, after “is” -- delete “in”;

In Claim 3, Col. 8, line 9, after “left-hinged” insert -- operating --;

In Claim 3, Col. 8, line 9, delete “riving” and insert -- driving --; and

In Claim 5, Col. 8, line 18, delete “operably” and insert -- operatively --.

Signed and Sealed this

Fifth Day of December, 2006

JON W. DUDAS
*Director of the United States Patent and Trademark Office*